Figure 1A:
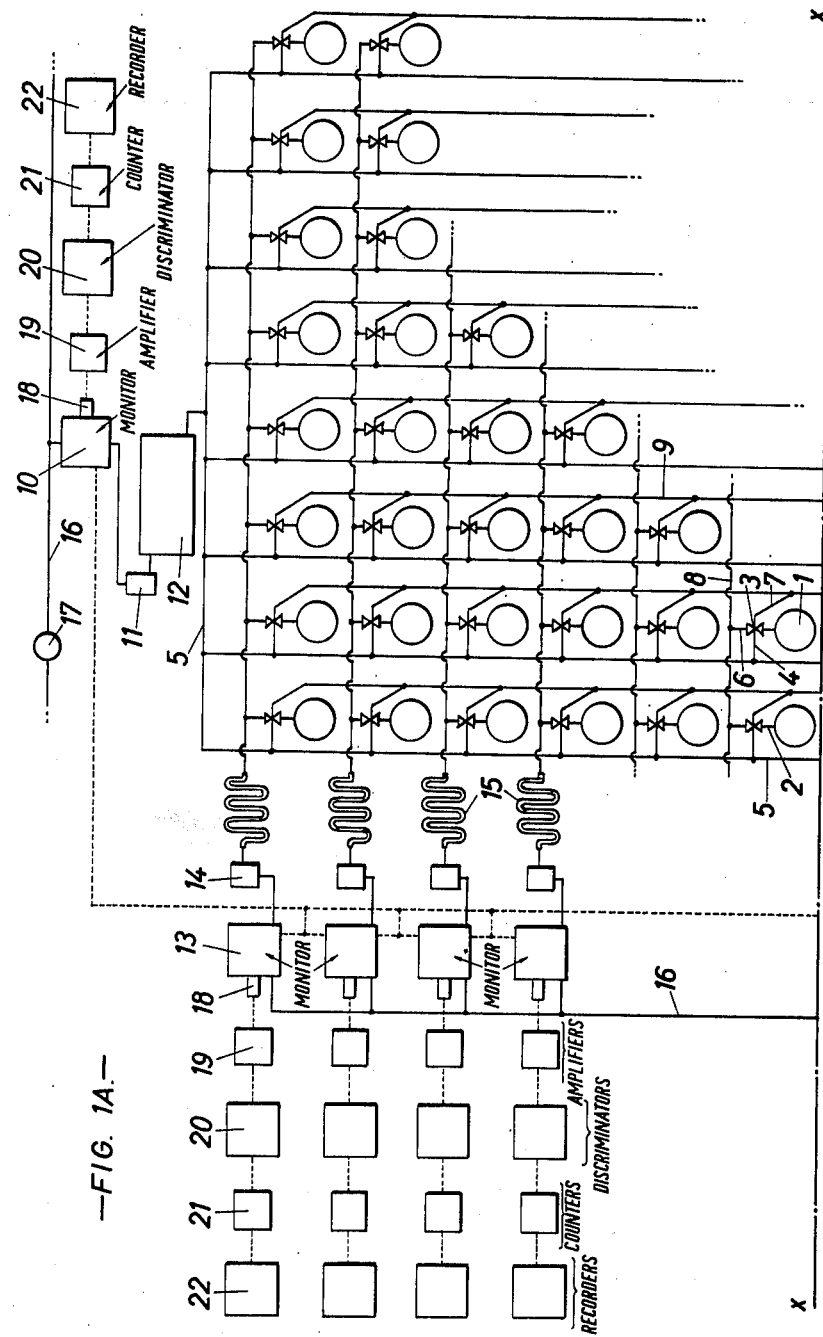

Aug. 10, 1965   L. G. RALFE ETAL   3,200,041
METHOD AND APPARATUS FOR REACTOR LEAK DETECTION
Filed April 29, 1960   3 Sheets-Sheet 1

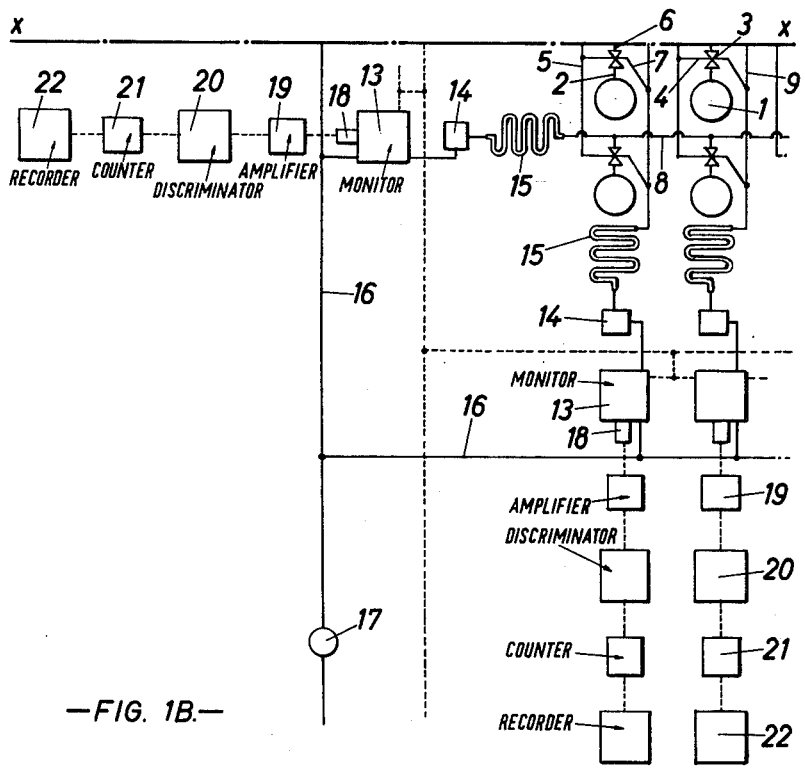
—FIG. 1B.—

United States Patent Office 3,200,041
Patented Aug. 10, 1965

3,200,041
METHOD AND APPARATUS FOR REACTOR LEAK DETECTION
Leonard George Ralfe, Streatley, and Francis Thomas William Paget, Orford, Warrington, England, assignors to United Kingdom Atomic Energy Authority, London, England
Filed Apr. 29, 1960, Ser. No. 25,715
Claims priority, application Great Britain, Jan. 20, 1959, 2,088/59
7 Claims. (Cl. 176—19)

This invention relates to a method of and means for testing for the presence of damaged fuel cartridges in a fluid-cooled nuclear reactor.

This patent application is a continuation-in-part of applicants' co-pending application Serial No. 24,188 now abandoned, filed January 20, 1960, for Nuclear Reactors.

In a known method of testing for damaged fuel cartridges in a fluid-cooled reactor fission products released into the reactor coolant from a leaking fuel cartridge (comprising a protectively sheathed nuclear fuel member) precipitate solid daughter products on a surface under the influence of an electric field and thereafter the surface is monitored to detect radiation from the precipitated daughter products. Hitherto such testing has been based on detection of short-lived fission products because it was found necessary to monitor samples of coolant from reactor fuel channels sequentially and not continuously (to avoid having a separate detector for each channel or small group of channels, which would have been expensive both of equipment and of space) and since channels remained unmonitored during the period whilst other channels were being monitored exposure of a coolant sample to the precipitation surface was limited so that the sampling cycle could be repeated as frequently as possible. Hence long-lived fission products were not precipitated in sufficient quantity to be detected.

It is considered that this method is open to disadvantage in that, if a fuel cartridge in a particular channel became defective in a manner such that a "pulse" of fission product activity emerged and subsequent effects reduced the activity to near or below the prevailing background level, the pulse might be missed if the channel containing the defective cartridge was not being monitored at the time the pulse occurred. Furthermore, as the major component of such a pulse may be long-lived fission products the detection of the pulse might still be missed even if the detector was monitoring the said channel at the time because, as explained above, long-lived fission products are not normally detected in this method.

According to the invention a method of testing for the presence of a damaged fuel cartridge in a fluid-cooled nuclear reactor comprises the steps of sampling coolant which has passed over fuel cartridges in the reactor, passing the sample over a surface which is under the influence of an electric field so that solid daughter products of long-lived fission products are precipitated on said surface and monitoring said surface to detect beta particles and gamma rays of energies greater than 3 mev.

The sampling may be effected at a position where the coolant emerges from a fuel channel or as it passes along main coolant ducts. The principal solid daughter product detected is rubidium-88 derived from krypton-88 which has a half life of 2.8 hours. Rubidium-88 emits beta particles in the range 2–5.2 mev.

Apparatus for testing for the presence of a damaged fuel cartridge in a nuclear reactor comprises, in accordance with the invention, sampling pipes for continuously taking two samples of coolant from each fuel channel in the reactor, said pipes being coupled with a cross matrix of sampling ducts so that coolant issuing from any channel is identified by its co-ordinates in the matrix, and monitors connected to said sampling ducts via means causing retardation of flow so that the time taken in passage from the entry of said pipes to the monitors is such that the principal active solid constituent in the coolant in the monitors emitting beta particles with energies greater than 3 mev. is rubidium-88.

Retardation of flow of the coolant may be accomplished by a labyrinth device. Retardation allows decay of most induced activity in the coolant (for example, nitrogen 16 in a carbon dioxide coolant) and of short lived fission products. The short-lived fission products are normally present in the coolant as a result of fission of uranium contamination on the outer surface of fuel cartridges as well as from defective fuel cartridges and the signal from short-lived fission products from the former source may otherwise be sufficient to swamp a signal due to long-lived fission products from a defective cartridge. For a carbon dioxide cooled reactor a retardation period which dispenses with most induced coolant activity and short-lived fission products and presents the said principal active constituent to the monitors, whilst retaining sufficient sensitivity for effective monitoring, is approximately three minutes. Argon 41 will probably still be present in the coolant sample but it can be discriminated against since it emits beta particles with energies less than 3 mev.

The monitor may comprise a precipitation chamber closed except for a fluid inlet and outlet and containing a phosphor coated with a charged thin metal electrode, an end of the phosphor being exposed to a photomultiplier tube connecting with a discriminator excluding most of the events below 3 mev., the discriminator feeding a signal, which may be amplified, to a counter and a recorder.

A filter may be incorporated in each sampling duct for preventing solid contaminants from passing to the precipitation chamber. If the coolant is an electrically conducting liquid the gaseous fission products must be separated from the liquid and only gases fed to the monitor.

In one way of carrying out the method of the invention one coolant sampling pipe is provided from each channel and incorporates a three way valve whose normal position connects the channel with its two sampling ducts in the cross matrix and whose alternative position connects the channel with another sampling duct connected to a monitor and employed for continuous monitoring of a single channel only.

In another way of carrying the invention into effect two separate sampling pipes are provided from each channel to connect the channel with its two sampling ducts in the cross matrix and a third sampling pipe is provided which can be connected to a portable monitor for individual monitoring of the channel.

Figure 2:
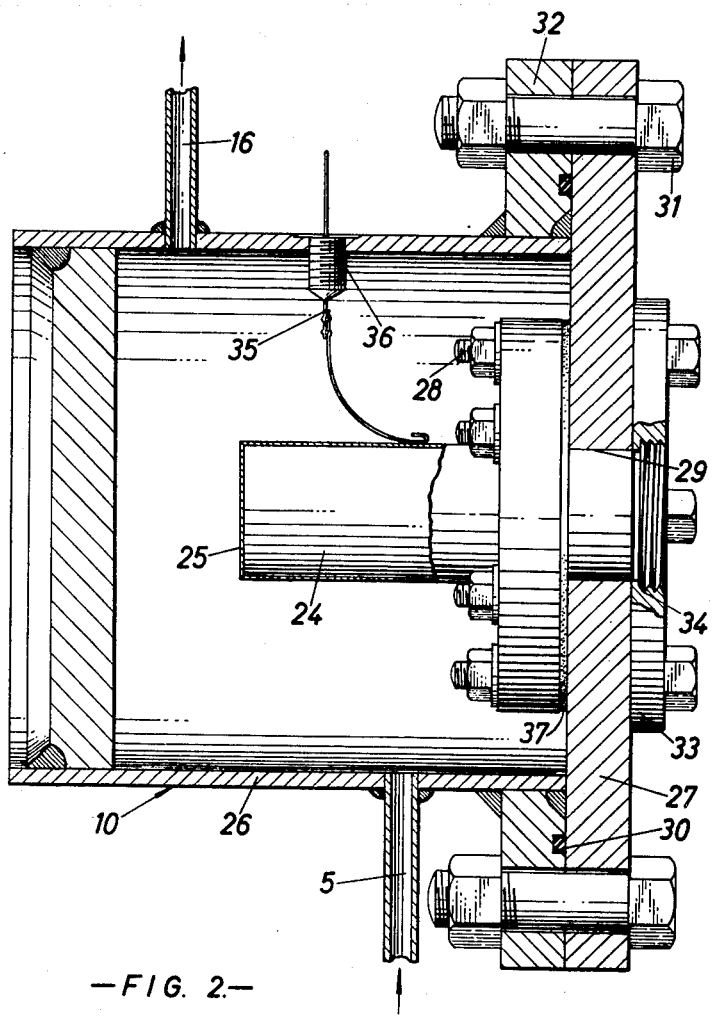

By way of example an embodiment of the invention will now be described with reference to the accompanying drawings wherein FIGS. 1A, 1B are diagrammatic views divided along the line X—X for the sake of clarity and FIG. 2 is a medial section.

In FIG. 1 are shown fuel element channels 1 which form part of a nuclear reactor core. A sampling pipe 2 is provided from each channel 1 and each pipe 2 incorporates a three-way valve 3 having an outlet 4 connecting the pipe 2 with a duct 5 common to all the channels 1 and outlets 6, 7 connecting the pipe 2 with sampling ducts 8, 9, respectively. Each valve is arranged so that the pipe 2 is connected either with the common duct 5 or with both a duct 8 and a duct 9. There are eight sampling ducts 8 and eight sampling ducts 9 in all, forming a cross-matrix system for sixty four channels 1. Each duct 8 is connected with eight channels 1 on the X-co-ordinate as drawn and each duct 9 is connected with eight channels 1 on the Y-co-ordinate as drawn.

The common duct 5 connects with a monitor 10 through a filter 11 and delay tank 12. The ducts 8, 9 each connect with a monitor 13 through a filter 14 and delay tubes 15 of larger bore than the ducts 8, 9. The tank 12 and tubes 15 serve to retard the flow of coolant from the channels 1 to the monitors 10, 13. The monitors 10, 13 are identical and are more fully described below with reference to FIG. 2. From the monitors 10, 13 lead pipes 16 which return coolant to the reactor. Pumps 17 are provided in the pipe 16 to draw coolant through the monitors and return it to the reactor. A photomultiplier unit 18 is in contact with each monitor 10, 13 and is electrically connected with an amplifier 19 a discriminator 20 including a further amplifier, a counter 21 and a recorder 22. An alarm circuit is also provided to operate when high activity is recorded. The electrical connections are shown in the drawing by dotted lines.

In FIG. 2 is shown the monitor 10. It comprises a generally cylindrical phosphor 24, with a metal coating 25, housed in a casing 26 having a cover 27 in which the phosphor 24 is mounted by means of studs 28 welded to the cover. A rubber sealing ring 37 is provided between the phosphor and the cover. The cover 27 has a central hole 29 in which the phosphor 24 is a sealing fit. The cover 27 is sealed to the casing 26 by a sealing ring 30 and bolts 31 passing through the cover 27 and an external flange 32 on the casing 26. The casing 26 and cover 27 thus together provide a precipitation chamber and a coolant inlet to the chamber is provided by the duct 5 and a coolant outlet by one of the pipes 16. A collar 33 is welded to the outside of the cover 27 so as to surround the hole 29. The collar 33 has an internal screw-thread 34 which accepts one of the photomultiplier units 18. A high tension lead 35 passes through a plug 36 of insulating material sealed in the wall of the casing 26. The end of the lead 35 is in the form of a spring which contacts the coating 25.

In the operation of the apparatus the valves 3 are normally set so that coolant is drawn continuously into the ducts 8, 9 by means of the pump 17. The coolant passes along the ducts 8, 9 through the delay tubes 15 and filters 14 and into the monitors 13. The delay tubes 15 allow time for decay of short-lived fission products and induced coolant activity which may be present in the coolant and the filters 14 remove particulate matter in the coolant. In the monitors 13 the coolant flows over the phosphor 24 on which the metal coating is maintained at a high potential (500–2000 volts) relative to the casing 26 by means of the lead 35. Thus solid daughter products produced by decay of fission products in the monitor are electrostatically precipitated on the metal coating and produce scintillations in the phosphor 24 as they in turn decay by emission of beta particles or gamma rays. These scintillations are picked up by the photomultiplier tube 18 and converted to electrical pulses which are amplified and passed to a discriminator 20 where pulses resulting from beta particles and gamma rays of energies greater than 3 mev. are further amplified and lesser pulses are rejected. The amplified pulses are then passed to a counter 21 and the count is recorded on a recorder 22.

Should a high signal be obtained such as to indicate the presence of a damaged fuel cartridge in the reactor core the channel containing the damaged cartridge may be identified by means of the cross matrix system. The valve 3 for that particular channel may then be reset so that the coolant sample flows into the duct 5 and hence into the monitor 10 where it can be continuously monitored as an individual channel before a decision is taken to discharge the fuel elements in that channel.

We claim:

1. Apparatus for testing for the presence of a damaged fuel cartridge in a nuclear reactor having a plurality of fuel channels forming a matrix, said apparatus comprising coolant sampling pipes for continuously taking two samples of coolant from each of said fuel channels in the reactor, said pipes being coupled with a cross-matrix of sampling ducts connected to said fuel channels for identifying gas issuing from any channel by its co-ordinates in the matrix, delay means connected to said sampling pipes, and monitors connected to said sampling ducts via said delay means, said delay means causing retardation of flow so that the time taken in passage from the entry of sampling coolant in said pipes to the monitors is such that the principal active solid constituent in the coolant in the monitors emitting beta particles with energies greater than 3 mev. is rubidium-88.

2. Apparatus according to claim 1 wherein one coolant sampling pipe is provided from each channel and incorporates a three-way valve whose normal position connects the channel with its two sampling ducts in the cross-matrix and whose alternative position connects the channel with another sampling duct connected to a monitor for continuous monitoring a single channel of a series of channels.

3. The method of testing for the presence of a leaking fuel cartridge in a nuclear reactor, said method comprising the steps of taking a sample of fluid coolant which has passed over said fuel cartridge, and thereby possibly become radioactive and contaminated with unstable gaseous fission products transmitting said sample to a monitoring point with a retarded flow having a time delay of a magnitude such that in said sample at the monitoring point the principal solid daughter product derived from the unstable gaseous fission products is rubidium 88, causing said rubidium to be deposited on a surface at said monitoring point and monitoring said surface to detect beta particles and gamma rays of energies greater than 3 mev.

4. The method according to claim 3 wherein the fluid coolant comprises carbon dioxide and the time delay is approximately three minutes.

5. The apparatus according to claim 1 wherein the delay means comprises tubes having bores larger than the bores of the ducts.

6. The apparatus according to claim 1 wherein the delay means comprises a tank.

7. The method of testing for the presence of a leaking fuel cartridge in a nuclear reactor having a plurality of cartridges and fluid coolant passing over said fuel cartridges so that it becomes radioactive and contaminated with unstable gaseous fission products, said method comprising the steps of taking two samples of fluid coolant at each of said cartridges, bulking each of said samples with different samples of fluid coolant from different cartridges, transmitting one of said bulked samples to a monitoring point with a retarded flow having a time delay of a magnitude such that in said sample at the monitoring point the principal daughter product derived from said unstable gaseous fission products and emitting radiations in excess of 3 mev. is rubidium 88, transmitting the other sample to a second monitoring point with a retarded flow having a time delay of a magnitude such that in said sample at the second monitoring point the principal daughter product derived from said unstable gaseous fission products and emitting radiations in excess of 3 mev. is also rubidium 88, causing said rubidium to be deposited on a surface at each of said monitoring points, monitoring said surfaces to detect beta particles and gamma rays of energies greater than 3 mev., and comparing the results of said monitoring to locate a leaking fuel cartridge.

References Cited by the Examiner
UNITED STATES PATENTS

| | | | |
|---|---|---|---|
| 2,625,657 | 1/53 | Kanne | 176—19 |
| 2,777,812 | 1/57 | Powell et al. | 176—19 |
| 2,954,473 | 9/60 | Hoover et al. | 250—71.5 |
| 2,987,459 | 6/61 | Labeyrie | 176—19 |
| 3,005,100 | 10/61 | Thompson | 240—71.5 |

FOREIGN PATENTS 219,184  11/58  Australia.

OTHER REFERENCES

WAPD–BT–3 (AEC Document), "The Theory of Failed Fuel Element Location and Detection," by Frank and Vogel, pp. 98–109, August 1957.

IRE Transactions on Nuclear Science, vol. NS–3, February 1956, page 23.

Nuclear Power, July 1959, pages 77–79.

BENJAMIN R. PADGETT, *Acting Primary Examiner.*
ROGER L. CAMPBELL, REUBEN EPSTEIN, CARL D. QUARFORTH, *Examiners.*